United States Patent
Kang et al.

(10) Patent No.: US 9,779,774 B1
(45) Date of Patent: Oct. 3, 2017

(54) GENERATING SEMANTICALLY MEANINGFUL VIDEO LOOPS IN A CINEMAGRAPH

(71) Applicant: Microsoft Technology Licensing, LLC, Redmond, WA (US)

(72) Inventors: Sing Bing Kang, Redmond, WA (US); Neel Suresh Joshi, Seattle, WA (US); Hugues Hoppe, Redmond, WA (US); Tae-Hyun Oh, Daejeon (KR); Baoyuan Wang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/264,789

(22) Filed: Sep. 14, 2016

Related U.S. Application Data

(60) Provisional application No. 62/365,896, filed on Jul. 22, 2016.

(51) Int. Cl.
 *H04N 5/93* (2006.01)
 *G11B 27/00* (2006.01)
 (Continued)

(52) U.S. Cl.
 CPC .............. *G11B 27/007* (2013.01); *G06T 5/40* (2013.01); *G06T 7/0022* (2013.01);
 (Continued)

(58) Field of Classification Search
 USPC ........................................ 386/248, 278, 280
 See application file for complete search history.

(56) References Cited

U.S. PATENT DOCUMENTS 6,278,446 B1 8/2001 Liou et al.
6,928,233 B1 8/2005 Walker et al.
(Continued)

FOREIGN PATENT DOCUMENTS

WO   9905865 A1   2/1999

OTHER PUBLICATIONS

Kolekar, et al., "A hierarchical framework for semantic scene classification in soccer sports video", In Proceedings of IEEE Region 10 Conference TENCON, Nov. 2008, 7 pages.
(Continued)

*Primary Examiner* — Nigar Chowdhury
(74) *Attorney, Agent, or Firm* — Lyon & Harr, LLP; Richard T. Lyon

(57) ABSTRACT

A cinemagraph is generated that includes one or more video loops. A cinemagraph generator receives an input video, and semantically segments the frames to identify regions that correspond to semantic objects and the semantic object depicted in each identified region. Input time intervals are then computed for the pixels of the frames of the input video. An input time interval for a particular pixel includes a per-pixel loop period and a per-pixel start time of a loop at the particular pixel. In addition, the input time interval of a pixel is based, in part, on one or more semantic terms which keep pixels associated with the same semantic object in the same video loop. A cinemagraph is then created using the input time intervals computed for the pixels of the frames of the input video.

20 Claims, 9 Drawing Sheets

(51) Int. Cl.
*G06T 7/00* (2017.01)
*G11B 27/034* (2006.01)
*G11B 27/10* (2006.01)
*G06T 5/40* (2006.01)
*G06T 13/80* (2011.01)

(52) U.S. Cl.
CPC .......... *G06T 7/0081* (2013.01); *G11B 27/002* (2013.01); *G11B 27/034* (2013.01); *G11B 27/105* (2013.01); *G06T 13/80* (2013.01); *G06T 2207/10016* (2013.01); *G06T 2207/20212* (2013.01); *G06T 2213/00* (2013.01)

(56) References Cited

U.S. PATENT DOCUMENTS

| | | |
|---|---|---|
| 6,999,620 B1 | 2/2006 | Harville |
| 7,203,620 B2 | 4/2007 | Li |
| 7,277,485 B1 | 10/2007 | Puri et al. |
| 7,450,758 B2 | 11/2008 | Cohen et al. |
| 8,886,017 B2 | 11/2014 | Kosaka et al. |
| 9,071,861 B1 | 6/2015 | Beale et al. |
| 9,330,718 B2 | 5/2016 | Middleton et al. |
| 2002/0080280 A1* | 6/2002 | Champion ............... G09G 5/00 348/584 |
| 2005/0111824 A1 | 5/2005 | Hunter et al. |
| 2007/0201558 A1 | 8/2007 | Xu et al. |
| 2007/0273696 A1 | 11/2007 | Cheng et al. |
| 2008/0263012 A1* | 10/2008 | Jones ................ G06F 17/30811 |
| 2008/0297514 A1* | 12/2008 | Pedersen ............... G06T 11/001 345/442 |

OTHER PUBLICATIONS

Pua, et al., "Real time repeated video sequence identification", In Journal of Computer Vision and Image Understanding, vol. 93, Mar. 2004, pp. 310-327.

Galmar, et al., "Spatiotemporal Semantic Video Segmentation", In Proceedings of International Workshop on Multimedia Signal Processing, Oct. 8, 2008, 6 pages.

* cited by examiner

GENERATING SEMANTICALLY MEANINGFUL VIDEO LOOPS IN A CINEMAGRAPH

BACKGROUND

Visual imagery commonly can be classified as either a static image (e.g., photograph, painting, etc.) or dynamic imagery (e.g., video, animation, etc.). A static image captures a single instant in time. For instance, a static photograph often derives its power by what is implied beyond its spatial and temporal boundaries (e.g., outside the frame and in moments before and after the photograph was taken). Typically, a viewer's imagination can fill in what is left out of the static image (e.g., spatially and/or temporally). In contrast, video loses some of that power; yet, by being dynamic, video can provide an unfolding temporal narrative through time.

Differing types of short videos can be created from an input video. The input video can be any video of any length, or a portion of a longer video. It can even be short video clip itself or short burst of images (e.g., 12 images captured at 10 frames per second). Examples of the short videos that can be created include cinemagraphs, which selectively freeze, play, and loop video regions to achieve compelling effects. The contrasting juxtaposition of looping elements against a still background can help grab the attention of a viewer. For instance, cinemagraphs can commonly combine static scenes with small repeating movements (e.g., a hair wisp blowing in the wind); thus, some motion and narrative can be captured in a cinemagraph. In a cinemagraph, the dynamic element is commonly looping in a sequence of frames.

Various techniques are conventionally employed to create video loops that look natural or visually pleasing. For example, some approaches define video textures by locating pairs of similar video frames to create a sparse transition graph. A stochastic traversal of this graph can generate non-repeating video; however, finding compatible frames may be difficult for scenes with many independently moving elements when employing such techniques. Other traditional approaches for creating video loops synthesize videos using a Markov Random Field (MRF) model. Such approaches can successively merge video patches offset in space and/or time, and determine an optimal merging scene using a binary graph cut. Introducing constraints can allow for creation of video loops with a specified global period. Other conventional techniques attempt to create panoramic video textures from a panning video sequence. Accordingly, a user can select a static background layer image and can draw masks to identify dynamic regions. For each region, a natural periodicity can be automatically determined. Then a 3D MRF model can be solved using a multi-label graph cut on a 3D grid. Still other techniques attempt to create panoramic stereo video textures by blending the overlapping video in the space-time volume.

Various approaches for interactive authoring of cinemagraphs have been developed. For example, regions of motion in a video can be automatically isolated. Moreover, a user can select which regions to make looping and which reference frame to use for each region. Looping can be achieved by finding matching frames or regions. Some conventional techniques for creating cinemagraphs can selectively stabilize motions in video. Accordingly, a user can sketch differing types of strokes to indicate regions to be made static, immobilized, or fully dynamic, where the strokes can be propagated across video frames using optical flow. The video can further be warped for stabilization and a 3D MRF problem can be solved to seamlessly merge the video with static content. Other recent techniques provide a set of idioms (e.g., static, play, loop and mirror loop) to allow a user to combine several spatiotemporal segments from a source video. These segments can be stabilized and composited together to emphasize scene elements or to form a narrative.

SUMMARY

Described herein are various technologies that pertain to generating a cinemagraph that includes one or more video loops. In one implementation, a cinemagraph generator receives an input video that includes a sequence of frames, and semantically segments the frames to identify regions that correspond to semantic objects. Input time intervals are then computed for the pixels of the frames of the input video. An input time interval for a particular pixel includes a per-pixel loop period and a per-pixel start time of a loop at the particular pixel. In addition, the input time interval of a pixel is based, in part, on semantic terms which keep pixels associated with the same semantic object in the same video loop. In one implementation, computing the input time intervals involves determining the respective input time intervals for the pixels that optimize an objective function. The objective function includes a temporal consistency term which is indicative of a temporal semantic consistency and a temporal photometric consistency across the frames from a loop start frame to an end loop frame, a static term which assigns a penalty value to static pixels, and a spatial consistency term which is indicative of a spatial semantic compatibility and a spatial photometric compatibility between spatially adjacent pixels over a loop period. A cinemagraph is created using the input time intervals computed for the pixels of the frames of the input video. This cinemagraph exhibits regions that appear static to a viewer and regions that include dynamic video loops that appear to the viewer to be changing over time.

In another implementation, a cinemagraph generator receives an input video that includes a sequence of frames as before; and semantically segments the frames to identify regions that correspond to semantic objects and the semantic object depicted in each identified region. Input time intervals are then computed for the pixels of the frames of the input video. Here again, an input time interval for a particular pixel includes a per-pixel loop period and a per-pixel start time of a loop at the particular pixel. In addition, the input time interval of a pixel is based, in part, on a semantic term which keeps pixels associated with the same semantic object in the same video loop. In one implementation, computing the input time intervals involves determining the respective input time intervals for the pixels that optimize an objective function. The objective function includes a temporal consistency term which is indicative of a temporal photometric consistency across the frames from a loop start frame to an end loop frame, a static term which assigns a penalty value to static pixels, and either a spatial consistency term which is indicative of a spatial photometric compatibility between spatially adjacent pixels over a loop period, or the semantic term, whichever is greater for the pixel (in general, it is possible to combine the spatial consistency term with a factor due to semantic information). A cinemagraph is then created using the input time intervals computed for the pixels of the frames of the input video. This cinemagraph also exhibits regions that appear static to a viewer and regions that include dynamic video loops that appear to the viewer to be changing over time.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
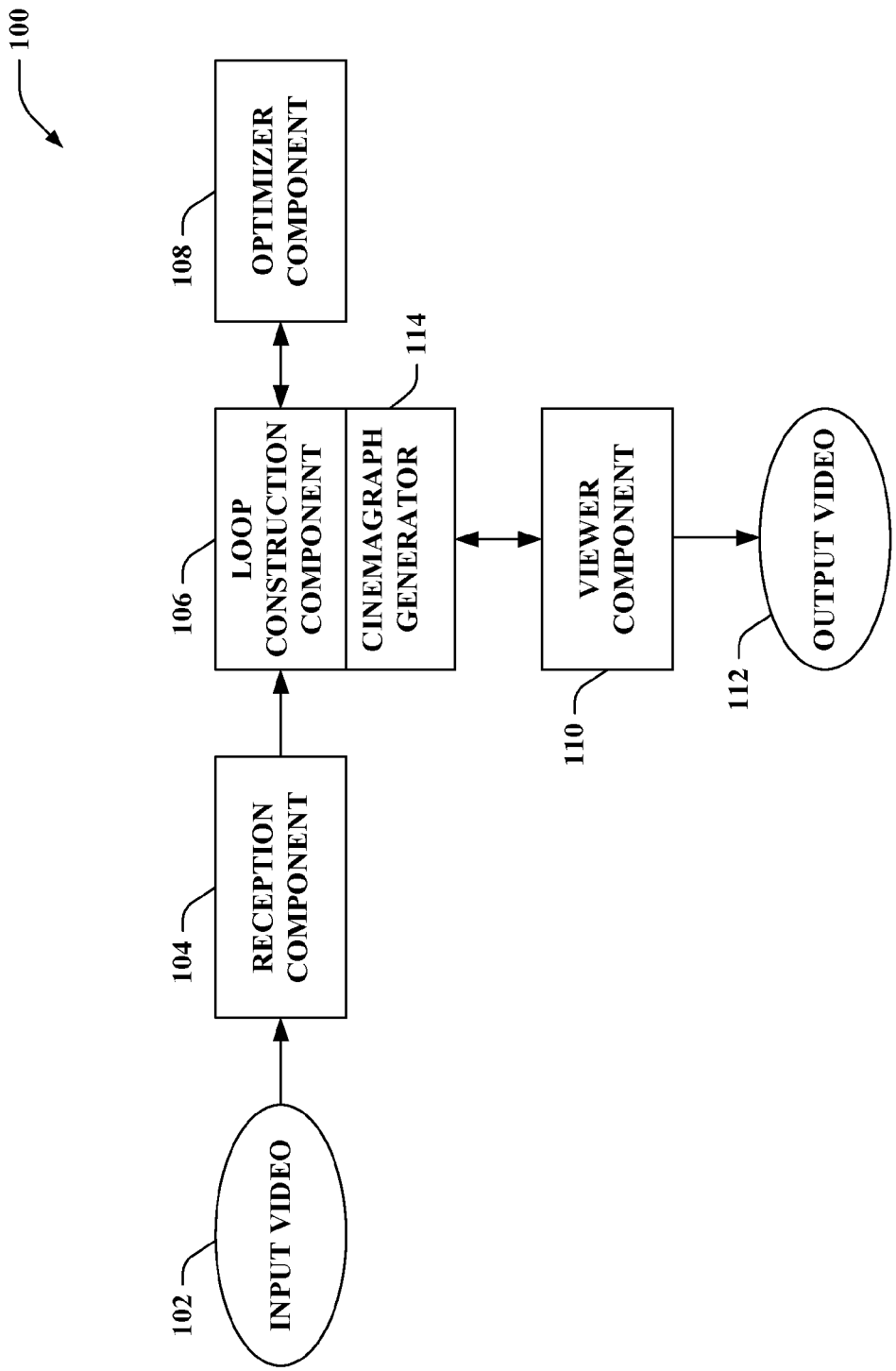
FIG. 1 illustrates a functional block diagram of an exemplary system that generates a cinemagraph that includes one or more video loops from an input video.

Various technologies pertaining to generating a cinemagraph that includes one or more video loops are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that generates a video loop from an input video 102. The system 100 includes a reception component 104 that receives the input video 102, where the input video 102 includes values at pixels over a time range. The input video 102 can be denoted as a three-dimensional (3D) volume V(x, t), with two-dimensional (2D) pixel location x and frame time t. The 2D pixel location x is also referred to herein as the pixel x.

The system 100 automates forming looping content from the input video 102. Certain motions in a scene included in the input video 102 can be rendered in an output video 112. It is contemplated that such motions can be stochastic or semi-periodic such as, for example, a person's face, swaying grasses, swinging branches, rippling puddles, and pulsing lights. These moving elements in a scene often have different loop periods; accordingly, the system 100 can automatically identify a respective per-pixel loop period for each pixel of the input video 102 as well as a respective per-pixel start time for each pixel of the input video 102. At a given pixel, a combination of a per-pixel loop period and a per-pixel start time can define an input time interval in the input video 102. A length of the input time interval is the per-pixel loop period, and a first frame of the input time interval is the per-pixel start time. Moreover, it is contemplated that some moving objects in the input video 102 can be static (e.g., frozen) in the output video 112

Conventional techniques for forming loops typically rely on user identification of spatial regions of the scene that are looping and user specification of a loop period for each of the identified spatial regions. Such conventional techniques also commonly rely on user identification of spatial regions of the scene that are static. In contrast to traditional approaches, the system 100 formulates video loop creation as an optimization in which a per-pixel loop period can be determined for each pixel of the input video 102. Moreover, it is contemplated that the per-pixel loop period of one or more of the pixels of the input video 102 may be unity, whereby a pixel becomes static. Therefore, the optimization can automatically segment a scene into regions with naturally occurring periods, as well as regions that are static.

Further, looping content can be parameterized to preserve phase coherence, which can cause the optimization to be more tractable. For each pixel, there can be one degree of freedom available to temporally shift a video loop (e.g., the repeating time interval identified from the input video 102 using the per-pixel loop period and the per-pixel start time) in the output video 112. Thus, different delays can be introduced at each pixel, where a delay for a given pixel influences when the given pixel begins a loop in the output video 112. These delays can be set so as to preserve phase coherence, which can enhance spatiotemporal consistency. Accordingly, if two adjacent pixels are assigned the same per-pixel loop period and have respective input time intervals with non-zero overlap, then the pixel values within the time overlap can concurrently appear for both pixels in the output video 112. By way of illustration, if pixel C and pixel D have a common per-pixel loop period, and pixel C has a start frame that is 2 frames earlier than pixel D, then the loop at pixel D in the output video 112 can be shifted by 2 frames relative to the loop at pixel C such that content of the pixel C and the pixel D appears to be synchronized.

The system 100 can be at least part of a dedicated interactive tool that allows the output video 112 to be produced from the input video 102, for example. According to another example, the system 100 can be at least part of a set of dedicated interactive tools, which can include a dedicated interactive tool for forming a video loop from the input video 102 and a disparate dedicated interactive tool for producing the output video 112 from the formed video loop. By way of another example, it is contemplated that the system 100 can be included in a device that captures the input video 102; thus, the system 100 can be configured for execution by a processor of the device that captures the input video 102. Following this example, a camera of a smartphone can capture the input video 102, and a user can employ the smartphone to create the output video 112 using the system 100 (e.g., executed by a processor of the smartphone that captured the input video 102). Pursuant to a further example, a portion of the system 100 can be included in a device that captures the input video 102 (e.g., configured for execution by a processor of the device that captures the input video 102) and a remainder of the system 100 can be included in a disparate device (e.g., configured for execution by a processor of the disparate device); following this example, the portion of the system 100 included in the device that captures the input video 102 can form a video loop, while the remainder of the system 100 included in the disparate device can create the output video 112 from the formed video loop.

The reception component 104 can receive the input video 102 from substantially any source. For example, the reception component 104 can receive the input video 102 from a camera that captures the input video 102. Pursuant to another example, a camera that captures the input video 102 can include the reception component 104. According to another example, the reception component 104 can receive the input video 102 from a data repository that retains the input video 102. It is to be appreciated, however, that the claimed subject matter is not limited to the foregoing examples.

Many types of devices, such as smartphones, cameras, tablet computers, laptop computers, mobile gaming consoles, and the like, can capture the input video 102. For instance, it is to be appreciated that such types of devices can capture high-definition video as well as photographs. Moreover, with increased parallel processing, the gap in resolution between these two media is narrowing. Thus, it may become more commonplace to archive short bursts of video rather than still frames. Accordingly, looping content can be automatically formed from the short bursts of captured video using the system 100.

The input video 102 received by the reception component 104 may have previously been stabilized (e.g., prior to receipt by the reception component 104), for example. According to another example, the input video 102 can be stabilized subsequent to being received by the reception component 104 (e.g., the reception component 104 can stabilize the input video 102, a stabilization component can stabilize the input video 102, etc.). Stabilization of the input video 102 can be performed automatically or with user guidance.

The system 100 further includes a loop construction component 106 that can cause an optimizer component 108 to perform an optimization to determine a respective input time interval within the time range of the input video 102 for each pixel in the input video 102. A respective input time interval for a particular pixel can include a per-pixel loop period and a per-pixel start time of a loop at the particular pixel within the time range from the input video 102. For example, the loop construction component 106 can cause the optimizer component 108 to perform the optimization to determine the respective input time intervals within the time range of the input video 102 for the pixels that optimize an objective function.

Moreover, the system 100 includes a viewer component 110 that can create the output video 112 based upon the values at the pixels over the respective input time intervals for the pixels in the input video 102. The viewer component 110 can generate the output video 112 based upon the video loop created by the loop construction component 106. The output video 112 can include looping content and/or static content. The output video 112 can be denoted as a 3D volume L(x, t), with the 2D pixel location x and frame time t. Moreover, the viewer component 110 can cause the output video 112 to be rendered on a display screen of a device.

The system 100 attempts to maintain spatiotemporal consistency in the output video 112 (e.g., a loop can avoid undesirable spatial seams or temporal pops that can occur when content of the output video 112 is not locally consistent with the input video 102). Due to stabilization of the input video 102, the output video 112 can be formed by the viewer component 110 retrieving, for each pixel of the output video 112, content associated with the same pixel in the input video 102. The content retrieved from the input video 102 and included in the output video 112 by the viewer component 110 can be either static or looping. More particularly, the content can be represented as a temporal interval $[s_x, s_x+p_x]$ from the input video 102, where $s_x$ is a per-pixel start time of a loop for a pixel x and $p_x$ is a per-pixel loop period for the pixel x. The per-pixel start time $s_x$ and the per-pixel loop period $p_x$ can be expressed in units of frames. A static pixel thus corresponds to the case $p_x=1$.

Figure 2:
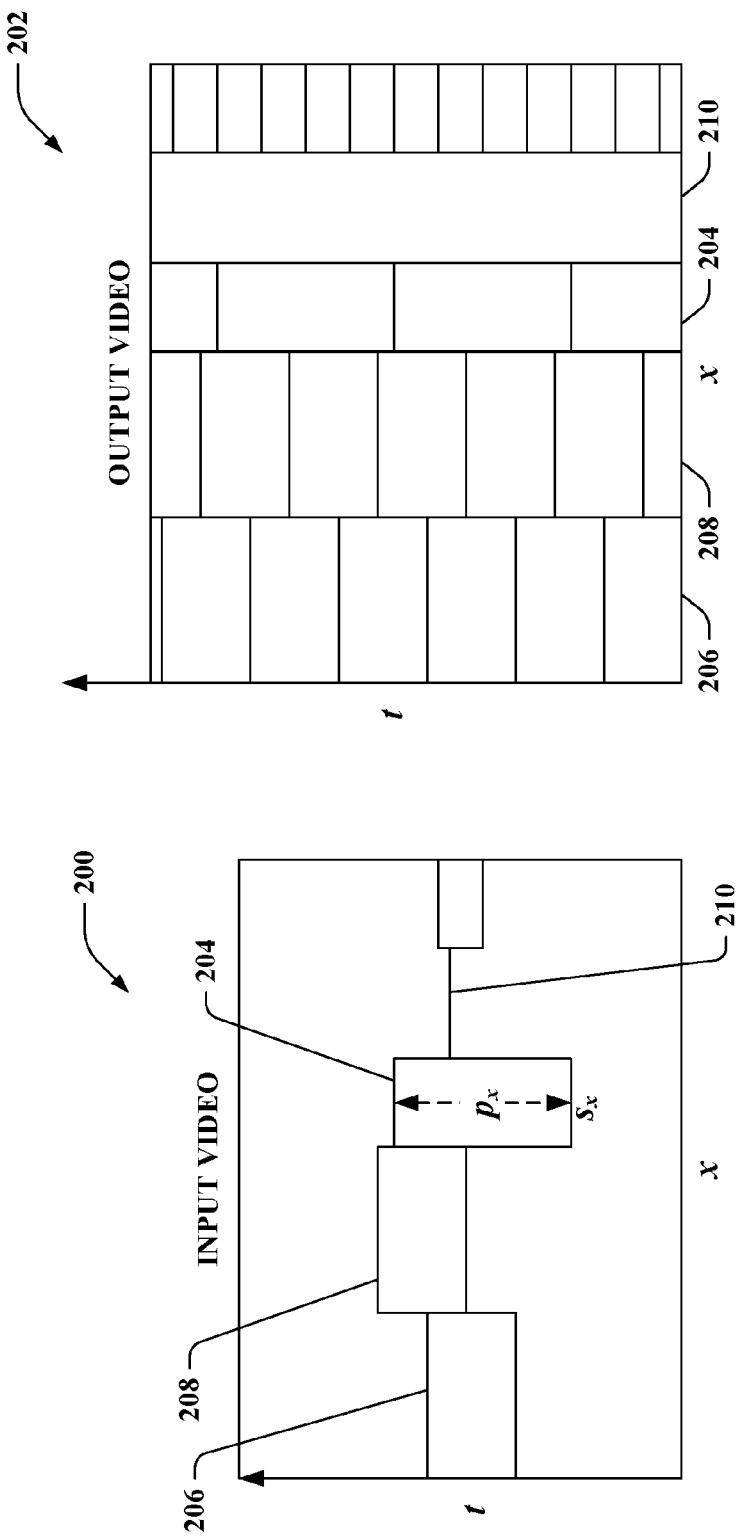
FIG. 2 illustrates an exemplary input video V(x, t) and a corresponding exemplary output video L(x, t).

Turning to FIG. 2, illustrated is an exemplary input video 200, V(x, t), and a corresponding exemplary output video 202, L(x, t). Input time intervals can be determined for each pixel in the input video 200 (e.g., by the loop construction component 106 of FIG. 1). As shown, pixels included in a spatial region 204 of the input video 200 each have a per-pixel start time of $s_x$ and a per-pixel loop period of $p_x$. Further, as depicted, pixels included in a spatial region 206 of the input video 200 and pixels included in a spatial region 208 of the input video 200 each have a common per-pixel loop period; however, a per-pixel start time of the pixels included in the spatial region 206 of the input video 200 differs from a per-pixel start time of the pixels included in the spatial region 208 of the input video 200. Moreover, pixels included in a spatial region 210 of the input video 200 are static (e.g., a unity per-pixel loop period).

Values from the respective input time intervals for the pixels from the input video 200 can be time-mapped to the output video 202. For example, the input time interval from the input video 200 for the pixels included in the spatial region 206 can be looped in the output video 202 for the pixels included in the spatial region 206. Also, as depicted, static values for the pixels included in the spatial region 210 from the specified time of the input video 200 can be maintained for the pixels included in the spatial region 210 over a time range of the output video 202.

The time-mapping function utilized to map the input time intervals from the input video 200 to the output video 202 can preserve phase differences between differing spatial regions, which can assist maintaining spatial consistency across adjacent pixels in differing spatial regions with a common per-pixel loop period and differing per-pixel start times. Thus, an offset between the input time interval for the pixels in the spatial region 206 and the input time interval for the pixels in the spatial region 208 from the input video 200 can be maintained in the output video 202 to provide synchronization.

Again, reference is made to FIG. 1. The viewer component 110 can time-map a respective input time interval for a particular pixel in the input video 102 to the output video 112 utilizing a modulo-based time-mapping function. An output of the modulo-based time-mapping function for the particular pixel can be based on the per-pixel loop period and the per-pixel start time of the loop at the particular pixel from the input video 102. Accordingly, a relation between the input video 102 and the output video 112 can be defined as:

$$L(x,t)=V(x,\phi(x,t)), t \geq 0.$$

In the foregoing, $\phi(x, t)$ is the time-mapping function set forth as follows:

$$\phi(x,t)=s_x-((t-s_x) \bmod p_x).$$

Due to the above modulo arithmetic of the time-mapping function, if two adjacent pixels are looping with the same period in the input video 102, then the viewer component 110 can cause such adjacent pixels to be in-phase in the output video 112 (e.g., in an output loop).

Figure 3:
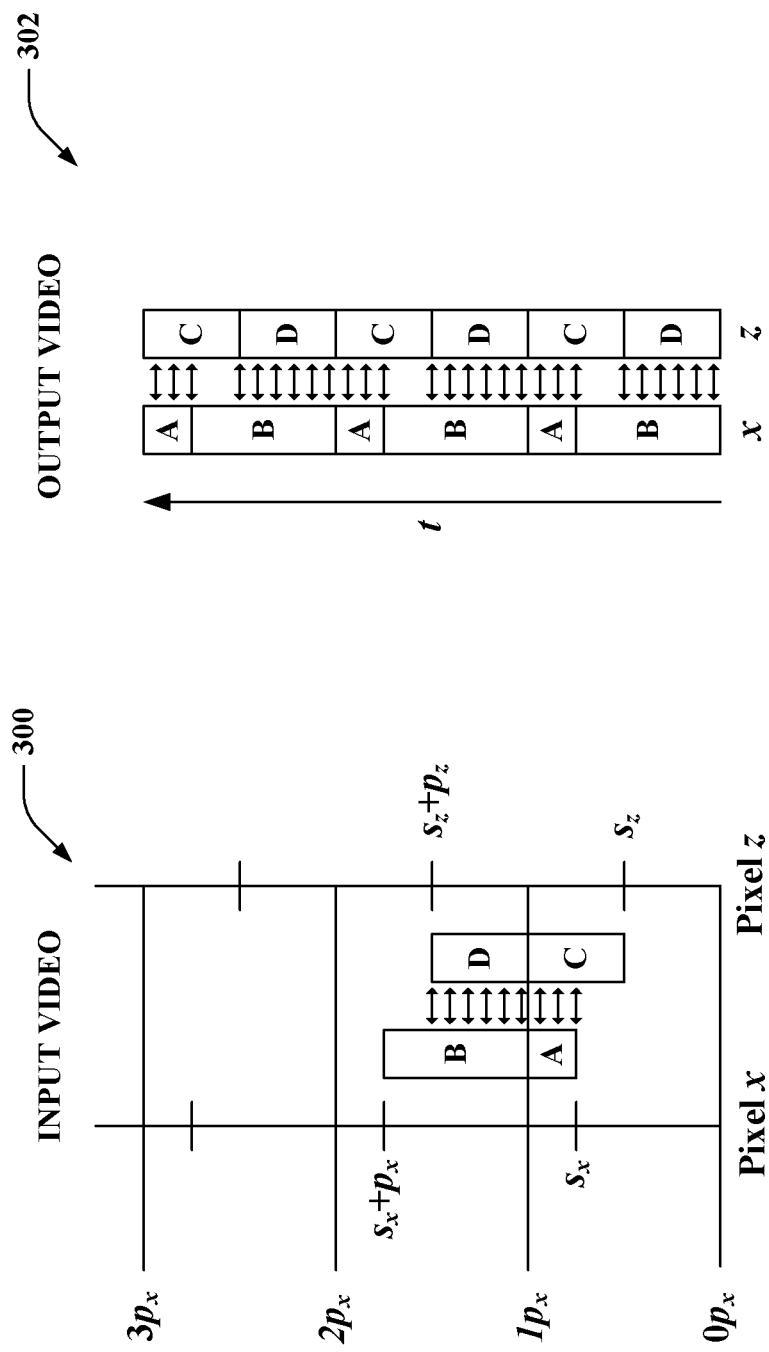
FIG. 3 illustrates an exemplary time-mapping from an input video to an output video.

FIG. 3 illustrates an exemplary time-mapping from an input video 300 to an output video 302. In the depicted example of FIG. 3, pixel x and pixel z are spatially adjacent. The pixels x and z have the same per-pixel loop period, and thus, $p_x = p_z$. Further, a start time for the pixel x, $s_x$, differs from a start time for the pixel z, $s_z$.

Content from the input time interval $[s_x, s_x+p_x]$ of the input video 300 can be retrieved for the pixel x and content from the input time interval $[s_z, s_z+pz$ of the input video 300 can be retrieved for the pixel z. Although the start times $s_x$ and $s_z$ differ, the input time intervals can have significant overlap as illustrated by the arrows between the input time intervals in the input video 300. Since the adjacent pixels x and z have the same loop period and similar start times, the in-phase time-mapping function of Equation 1 above can automatically preserve spatiotemporal consistency over a significant portion of the output timeline shown in FIG. 3 for the output video 302 (represented by the arrows). The time-mapping function can wrap the respective input time intervals for the pixel x and the pixel z in the output timeline to maintain adjacency within the temporal overlap, and thus, can automatically preserve spatial consistency.

Solving for start times can encourage phase coherence to be maintained between adjacent pixels. Moreover, loops within the input video 102 can have regions that loop in-phase with a common optimized period, but with staggered per-pixel start times for differing regions. In contrast to determining start times for pixels, some conventional approaches solve for time offsets between output and input videos.

While many of the examples set forth herein pertain to time-mapping where loops from an input video move forward in time in an output video, other types of time-mappings are intended to fall within the scope of the hereto appended claims. For instance, time-mappings such as mirror loops, reverse loops, or reverse mirror loops can be employed, and thus, optimization for such other types of time-mappings can be performed.

Reference is again made to FIG. 1. As set forth herein, the loop construction component 106 can cause the optimizer component 108 to perform the optimization to determine the respective input time intervals within the time range of the input video 102 for the pixels that optimize an objective function. Video loop construction can be formulated as an MRF problem. Accordingly, the per-pixel start times $s=\{s_x\}$ and the per-pixel loop periods $p=\{p_x\}$ that minimize the following objective function can be identified:

$$E(s,p)=E_{consistency}(s,p)+E_{static}(s,p)$$

In the foregoing objective function, the first term can encourage pixel neighborhoods in the video loop to be consistent both spatially and temporally with those in the input video 102. Moreover, the second term in the above noted objective function can penalize assignment of static loop pixels except in regions of the input video 102 that are static. In contrast to conventional approaches, the MRF graph can be defined over a 2D spatial domain rather than a full 3D video volume. Also, in contrast to conventional approaches, the set of unknowns can include a per-pixel loop period at each pixel.

According to an example, the loop construction component 106 can cause the optimizer component 108 to solve the MRF optimization using a multi-label graph cut algorithm, where the set of pixel labels is the outer product of candidate start times {s} and periods {p}. In addition, as indicated previously, the discovery of regions for looping takes into consideration the semantics of the scene to force pixels within the same semantic segment to have the same looping parameters. By employing semantic segmentation to prevent breaking up semantically meaningful objects, the loops generated for that object cover the entire region containing the object. For example, a standard video loop generation technique may break up a person's face into different parts and render different looping regions. As a result, you may see eyes blinking independently, which looks unnatural. However, by employing semantic segmentation to prevent breaking up semantically meaningful objects (e.g., face regions), the loops generated for that object are over the entire region. This concept can apply to any semantically meaningful segments, such as the aforementioned person's face, animals, man-made objects such as motorcycles and cars, to name a few.

This concept can employ any semantic segmentation technique, such as the technique described in J. Long, E. Shelhamer, and T. Darrell, "Fully Convolutional Networks for Semantic Segmentation," IEEE Conference on Computer Vision and Pattern Recognition, 2015 for general objects; and in D. Chen, S. Ren, Y. Wei, X. Cao, and J. Sun, "Joint Cascade Face Detection and Alignment," European Conference on Computer Vision, 2014 for faces.

Before describing the creation of semantically meaningful video loops in more detail, it will be helpful to understand how a semantic-free video loop could be created. In the generated video loop created by the loop construction component 106, spatiotemporal neighbors of each pixel can look similar to those in the input video 102. Because the domain graph is defined on the 2D spatial grid, the objective function can distinguish both spatial and temporal consistency:

$$E_{consistency}(s,p)=\beta E_{spatial}(s,p)+E_{temporal}(s,p)$$

The spatial consistency term $E_{spatial}$ can measure compatibility for each pair of adjacent pixels x and z, averaged over time frames in the video loop.

$$E_{spatial} = \sum_{\|x-z\|=1} \frac{\gamma_s(x, z)}{T} \sum_{t=0}^{T-1} \left( \begin{array}{l} \|V(x, \phi(x, t)) - V(x, \phi(z, t))\|^2 + \\ \|V(z, \phi(x, t)) - V(z, \phi(z, t))\|^2 \end{array} \right)$$

The period T is the least common multiple (LCM) of the per-pixel loop periods of the pixels in the input video 102. Accordingly, the objective can be formulated as $\lim_{T \to \infty} E_{spatial}$, the average spatial consistency over an infinitely looping video. Further, pixel value differences at both pixels x and z can be computed for symmetry. Moreover, the factor $\gamma_s(x, z)$ can be as follows:

$$\gamma_s(x, z) = \frac{1}{1 + \lambda_s \text{MAD}_t \|V(x, t) - V(z, t)\|}$$

The factor $\gamma_s(x, z)$ can reduce the consistency cost between pixels when the temporal median absolute deviation (MAD) of the color values (e.g., differences of color values) in the input video 102 is large because inconsistency may be less perceptible. It is contemplated that MAD can be employed rather than variance due to MAD being less sensitive to outliers; yet, it is to be appreciated that the claimed subject matter is not so limited. Pursuant to another example, the MAD metric can be defined in terms of respective neighborhoods of the pixel x and the pixel z, instead of single pixel values V(x, t) and V(z, t). According to a further example, $\lambda_s$ can be set to 100; however, the claimed subject matter is not so limited.

The energy $E_{spatial}(x, z)$ can be simplified for various scenarios, which can enable efficient evaluation. According to an exemplary scenario, pixels x and z can both be static. Thus, the energy can reduce to:

$$E_{spatial}(x,z) = \|V(x,s_x) - V(x,s_z)\|^2 + \|V(z,s_x) - V(z,s_z)\|^2.$$

In accordance with another exemplary scenario, pixel x can be static and pixel z can be looping. Accordingly, the energy can simplify to:

$$E_{spatial}(x, z) = \frac{1}{T}\sum_{t=0}^{T-1}\left(\begin{array}{l}\|V(x, s_x) - V(x, \phi(z, t))\|^2 + \\ \|V(z, s_x) - V(z, \phi(z, t))\|^2\end{array}\right)$$

For each of the two summed vector norms and for each color coefficient $v_c \in V$, the sum can be obtained as:

$$\frac{1}{T}\sum_{t=0}^{T-1}(v_c(x, s_x) - v_c(x, \phi(z, t)))^2 =$$

$$v_c^2(x, s_x) - \frac{2n_c(x, s_x)}{p_z}\sum_{t=s_z}^{s_z+p_z-1}v_c(x, t) + \frac{1}{p_z}\sum_{t=s_z}^{s_z+p_z-1}v_c^2(x, t)$$

The two sums above can be evaluated in constant time by pre-computing temporal cumulative sum tables on V and $V^2$.

In accordance with another exemplary scenario, when both pixels x and z are looping with the same period, $p_x = p_z$, the energy can reduce to:

$$E_{spatial}(x, z) = \frac{1}{p_x}\sum_{t=0}^{p_x-1}\left(\begin{array}{l}\|V(x, \phi(x, t)) - V(x, \phi(z, t))\|^2 + \\ \|V(z, \phi(x, t)) - V(z, \phi(z, t))\|^2\end{array}\right)$$

Further, the zero value terms for which $\phi(x, t) = \phi(z, t)$ can be detected and ignored. Thus, as previously illustrated in FIG. 3, for the case where start times are similar, significant time intervals marked with arrows in FIG. 3 can be ignored.

According to another exemplary scenario, when the pixels have differing loop periods, generally the sum is computed using $T = \text{LCM}(p_x, p_z)$. However, when the two loop periods are relatively prime (e.g., $\text{LCM}(p_x, p_z) = p_x p_z$), then the following can be evaluated:

$$\frac{1}{mn}\sum_{i=0}^{m-1}\sum_{j=0}^{n-1}(a_i - a_j)^2 = \frac{1}{m}\sum_{i=0}^{m-1}a_i^2 + \frac{1}{n}\sum_{j=0}^{n-1}b_i^2 - \frac{2}{mn}\left(\sum_{i=0}^{m-1}a_i\right)\left(\sum_{j=0}^{n-1}b_i\right)$$

In the foregoing, a and b correspond to coefficients in $V(x,\bullet)$ and $V(z,\bullet)$. Thus, the recomputed cumulative sum tables from the exemplary scenario noted above where pixel x is static and pixel z is looping can be reused to evaluate these terms in constant time.

Moreover, it is contemplated that the expected squared difference can be used as an approximation even when the periods $p_x$ and $p_z$ are not relatively prime. Such approximation can provide a speed up without appreciably affecting result quality.

Moreover, as noted above, the objective function can include a temporal consistency objective term $E_{temporal}$.

$$E_{temporal} = \sum_x \left(\begin{array}{l}\|V(x, s_x) - V(x, s_x + p_x)\|^2 + \\ \|V(x, s_x - 1) - V(x, s_x + p_x - 1)\|^2\end{array}\right)\gamma_t(x)$$

The aforementioned temporal consistency objective term can compare, for each pixel, the value at the per-pixel start time of the loop $s_x$ and the value after the per-pixel end time of the loop $s_x + p_x$ (e.g., from a next frame after the per-pixel end time) and, for symmetry, the value before the per-pixel start time of the loop $s_x - 1$ (e.g., from a previous frame before the per-pixel start time) and the value at the per-pixel end time of the loop $s_x + p_x - 1$.

Because looping discontinuities are less perceptible when a pixel varies significantly over time in the input video 102, the consistency cost can be attenuated using the following factor:

$$\gamma_t(x) = \frac{1}{1 + \lambda_t \text{MAD}_t \|V(x, t) - V(x, t+1)\|}$$

The foregoing factor can estimate the temporal variation at the pixel based on the median absolute deviation of successive pixel differences. According to an example, $\lambda_t$ can be set to 400; yet, the claimed subject matter is not so limited.

For a pixel assigned as being static (e.g., $p_x = 1$), $E_{temporal}$ can compute the pixel value difference between successive frames, and therefore, can favor pixels with zero optical flow in the input video 102. While such behavior can be reasonable, it may be found that moving objects can be inhibited from being frozen in a static image. According to another example, it is contemplated that the temporal energy can be set to zero for a pixel assigned to be static.

According to an example, for looping pixels, a factor of $$\frac{1}{p_x}$$

can be utilized to account for shorter loops revealing temporal discontinuities more frequently relative to longer loops. However, it is to be appreciated that the claimed subject matter is not limited to utilization of such factor.

A neighborhood N of a pixel can refer to a spatiotemporal neighborhood of the pixel. Thus, the neighborhood of a given pixel can be a set of pixels within a specified window in both space and time around the given pixel, optionally weighted by a kernel (e.g., a Gaussian kernel) that reduces influence of pixel values that are farther away in space or time from the given pixel. Moreover, it is contemplated that the specified window for a neighborhood of a given pixel can include the given pixel while lacking other pixels (e.g., a neighborhood of a given pixel in the input video 102 can be the given pixel itself).

The term $E_{static}$ can be utilized to adjust the energy objective function based on whether the neighborhood N of each pixel has significant temporal variance in the input video 102. In one implementation, if a pixel is assigned a static label, it can incur a cost penalty $c_{static}$. Such penalty can be reduced according to the temporal variance of the neighborhood N of a pixel. Thus, $E_{static}=\Sigma_{x|p_x=1}E_{static}(x)$ can be defined with:

$$E_{static}(x) = c_{static}\min(1, \lambda_{static})\text{MAD}_t\|N(x, t) - N(x, t+1)\|$$

In the foregoing, $\lambda_{static}$ can be set to 100, and N can be a Gaussian weighted spatial temporal neighborhood with $\sigma_x=0.9$ and $\sigma_t=1.2$; yet, the claimed subject matter is not so limited.

The semantically meaningful video loop implementation described herein modifies the foregoing looping procedure by computing an additional semantic term, which encourages neighboring pixels within the same semantic object to not separate in the final result. The same object is tracked over time, and the faster the object moves, the stronger semantic term used to discourage adjacent pixel breakup. In one implementation, the foregoing is achieved by replacing the aforementioned $E_{spatial}(x,z)$ term with an $E_{semantic}(x,z)$ term in certain circumstances. In another implementation, a temporal semantic consistency term is added to the $E_{temporal}(x,z)$ term, and a spatial semantic consistency term is used in the $E_{spatial}(x,z)$ term, to discourage adjacent pixel breakup in semantic object regions.

In the implementation involving replacing the $E_{spatial}(x,z)$ term with an $E_{semantic}(x,z)$ term, motion is computed as the ratio of the intersection of areas between adjacent time frames, mapped to between 1 and 255, namely, $w=254*A_{inter}/A_{max}+1$, where $A_{max}$ is the larger object area (measured by the number of pixels) of the two time frames and $A_{inter}$ is the area of intersection between the two objects at the two time frames. The faster an object moves, the smaller $A_{inter}$ is, and hence w as well. The multiplier factor uses w: $\zeta=(\zeta_{max}-1)*(\epsilon-w)/(\epsilon-1)+1$. The larger the object motion, the smaller w, and the larger $\zeta$. The semantic cost term, in turn, uses this multiplier factor: $E_{semantic}(x,z)=\zeta*c_{min}$. It replaces the usual cost term only if it is greater, i.e., $E_{spatial}(x,z)=\max(E_{semantic}(x,z),E_{spatial}(x,z))$. As an example, $\epsilon=210$, $\zeta_{max}=20$, and $c_{min}=500$; yet, the claimed subject matter is not so limited. Any alternative formulation with similar characteristics could be employed as well.

Referring again to FIG. 1, given the foregoing, in one implementation, a cinemagraph having one of more video loops is generated using system 100. More particularly, the loop construction component 106 includes a cinemagraph generator 114 which receives an input video 102 from the reception component 104. The cinemagraph generator comprising one or more computing devices, where the computing devices are in communication with each other via a computer network whenever there is a plurality of computing devices, and a computer program having a plurality of sub-programs executable by the computing devices. As indicated previously, the input video 102 includes a sequence of frames each frame of which is made up of pixels. The cinemagraph generator 114 uses the optimizer component 108 and the viewer component 110 to generate the output video 112 (which in this implementation is the cinemagraph).

Figure 4:
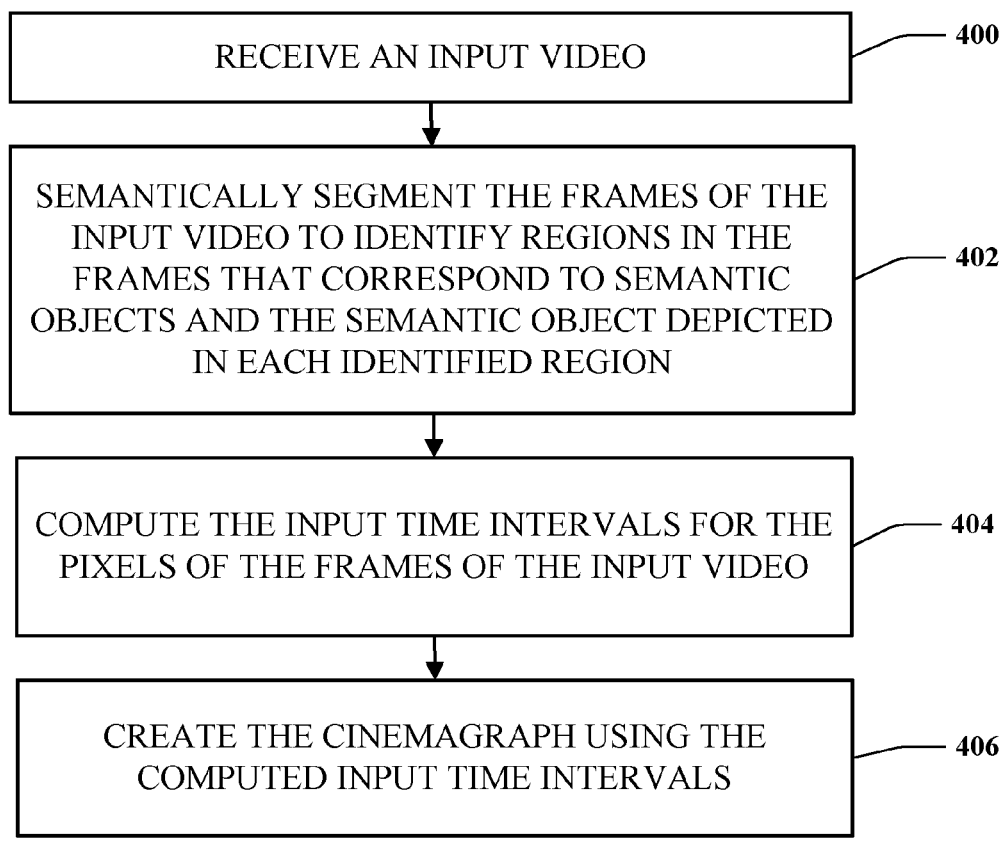
FIG. 4 is a flow diagram that illustrates one exemplary methodology for generating a cinemagraph that includes one or more video loops.

More particularly, referring to FIG. 4, the cinemagraph generator sub-programs configure the computing device(s) to generate a cinemagraph by first receiving an input video (400), as indicated previously. The frames of the input video are then semantically segmented to identify regions in the frames that correspond to semantic objects and the semantic object depicted in each identified region (402). In one implementation, more than one type of semantic object is identified. In another implementation, one type of semantic object is identified—namely a person's face. The input time intervals for the pixels of the frames of the input video are then computed (404). The input time interval for a particular pixel includes a per-pixel loop period and a per-pixel start time of a loop at the particular pixel. In addition, the input time interval for pixels residing in regions corresponding to a semantic object is based, in part, on a semantic term which keeps pixels associated with the same semantic object in the same video loop. The cinemagraph is then created using the input time intervals computed for the pixels of the frames of the input video (406). The cinemagraph can exhibit regions that appear static to a viewer and regions that include dynamic video loops that appear to the viewer to be changing over time.

The aforementioned cinemagraph generator sub-program for computing input time intervals for the pixels of the frames of the input video includes determining the respective input time intervals for the pixels that optimize an objective function. This objective function includes a temporal consistency term which is indicative of a temporal photometric consistency across the frames from a loop start frame to an end loop frame; a static term which assigns a penalty value to static pixels; and either a spatial consistency term which is indicative of a spatial photometric compatibility between spatially adjacent pixels over a loop period, or a semantic term, whichever is greater for the pixel.

Figure 5:
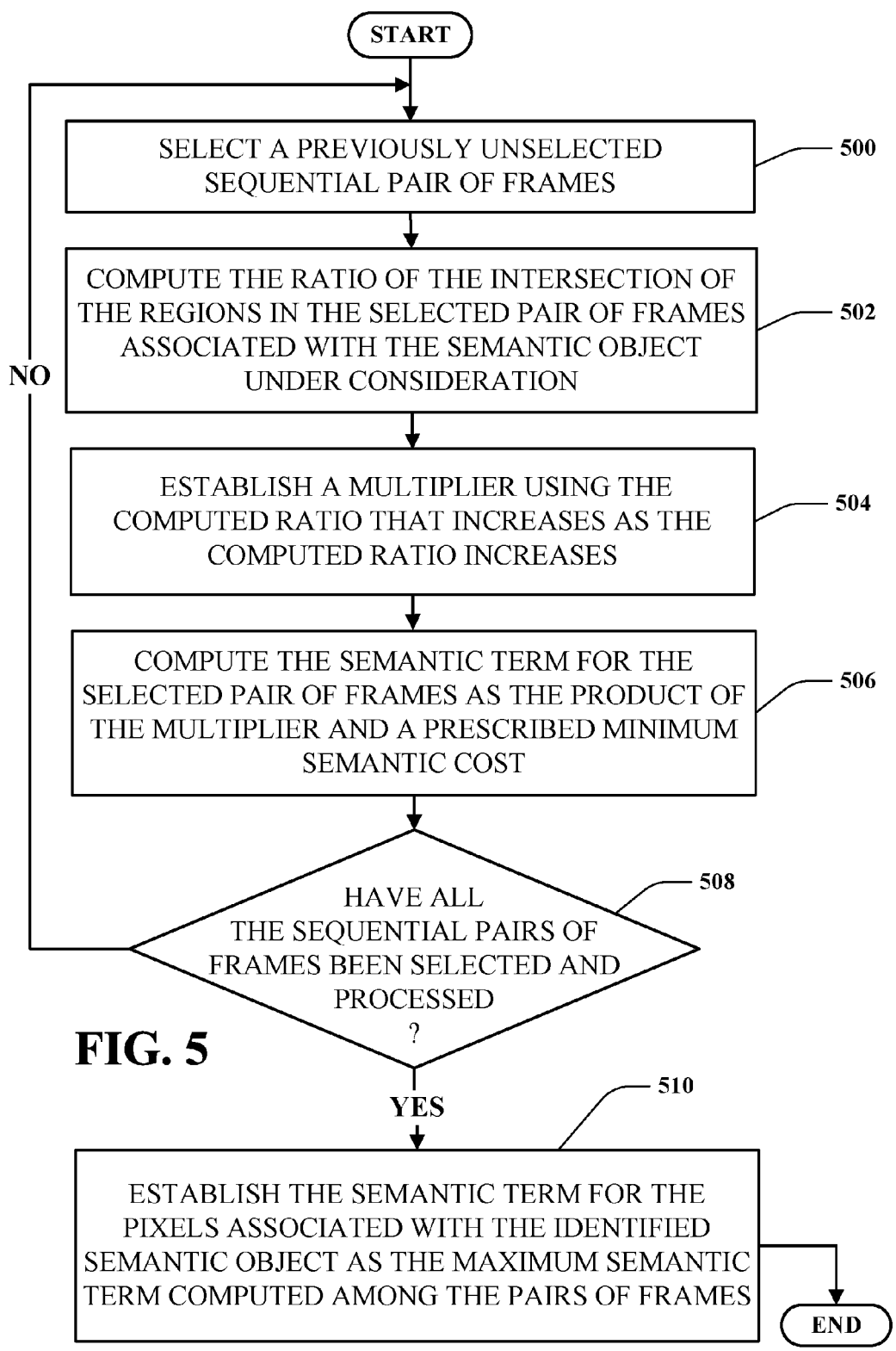
FIG. 5 is a flow diagram that illustrates one exemplary methodology for computing a semantic term for the pixels associated with an identified semantic object.

The foregoing semantic term measures the semantic difference between pixels. Referring to FIG. 5, in one implementation, computing a semantic term for the pixels associated with an identified semantic object includes selecting a previously unselected sequential pair of frames (500). For example, frame 1 and frame 2 are selected first, then frame 2 and frame 3 are selected, and so on. Next, the ratio of the intersection of the regions in the selected pair of frames associated with the semantic object under consideration is computed (502). In one implementation described previously, this involves computing the ratio of the number of pixels associated with the intersection of the regions in the pair of frames associated with the semantic object under consideration and the number of pixels associated with the larger of the two regions in the pair of frames associated with the semantic object. A multiplier is then established using the computed ratio that increases as the computed ratio increases (504). The semantic term for the selected pair of frames is then computed as the product of the multiplier and a prescribed minimum semantic cost (506). For example, this minimum semantic cost could be the $c_{min}$ of 500 mentioned previously. It is then determined if all the sequential pairs of frames have been selected and processed (508). If not, then actions (500) through (508) are repeated. When all the sequential pair of frames have been selected and processed, the semantic term for the pixels associated with the identified semantic object is established as the maximum semantic term computed among the pairs of frames (510).

As indicated previously, in one implementation semantic terms are added to the $E_{temporal}(x,z)$ and $E_{spatial}(x,z)$ terms. In this implementation, the following formulation is employed. Denoting start times $s=\{s_x\}$, periods $p=\{p_x\}$, $l=\{l_x\}$, where $l_x=\{s_x,p_x\}$, the video-loop problem can be formulated as the following MRF problem, $$\underset{s,p}{\arg\min} \sum_x \left( E_{temp.}(l_x) + \alpha_1 E_{static}(l_x) + \alpha_2 \sum_{z \in N(x)} E_{spa.}(l_x, l_z) \right), \quad (1)$$

where each term involves semantic consistency and photometric consistency. The temporal consistency term $E_{temp.}$ measures the consistency across the frames from the loop start frame $s_x$ to the end loop frame $s_x+p_x$ as $$E_{temp.}(l_x) = \gamma_t(x)[(1-w)\Phi_V(x) + w\Phi_F(x)], \quad (2)$$

where the temporal photometric consistency $\phi_V(x)$ and the temporal semantic consistency $\phi_F(x)$ are defined as follows:

$$\Phi_V(x) = \frac{1}{dim(V)} \left( \begin{array}{c} \|V(x, s_x) - V(x, s_x + p_x)\|^2 + \\ \|V(x, s_x - 1) - V(x, s_x + p_x - 1)\|^2 \end{array} \right),$$

$$\Phi_F(x) = \frac{1}{dim(F)} \left( \begin{array}{c} \|F(x, s_x) - F(x, s_x + p_x)\|^2 + \\ \|F(x, s_x - 1) - F(x, s_x + p_x - 1)\|^2 \end{array} \right).$$

The semantic feature as F(x, t) encodes semantic information of the scene, e.g., label map, semantic segmentation responses, intermediate activation of Convolutional Neural Networks (CNN). How F(x, t) is computed will be described shortly.

The static term $E_{static}$ assigns a penalty to static pixels to prevent a trivial all-static solution as $$E_{static}(l_x) = c_{static} \cdot \delta[p_x=1]. \quad (3)$$

The spatial consistency term $E_{spa.}$ is designed to measure the spatial photometric compatibility of color profiles between spatially adjacent pixels x and z over a loop period. This is extended to measure semantic compatibility between neighbor pixels as well. Then, $E_{spa.}$ is defined as $$E_{spa.}(l_x,l_z) = \gamma_s(x,z)[(1-w)\Psi_V(x,z) + w\Psi_F(x,z)]. \quad (4)$$

The spatial photometric compatibility $\Psi_V(x, z)$ and the spatial semantic compatibility $\Psi_F(x, z)$ are defined as follows:

$$\Psi_V(x, z) = \frac{1}{dim(V) \cdot T} \sum_{t=0}^{T-1} \left( \begin{array}{c} \|V(x, \phi(x, t)) - V(x, \phi(z, t))\|^2 + \\ \|V(z, \phi(x, t)) - V(z, \phi(z, t))\|^2 \end{array} \right),$$

$$\Psi_F(x, z) = \frac{1}{dim(F) \cdot T} \sum_{t=0}^{T-1} \left( \begin{array}{c} \|F(x, \phi(x, t)) - F(x, \phi(z, t))\|^2 + \\ \|F(z, \phi(x, t)) - F(z, \phi(z, t))\|^2 \end{array} \right),$$

where the period T is the least common multiple (LCM) of per-pixel periods.

The connectivity potential $\gamma_s(x, z)$ in Eq. 4 is employed to account for spatial coherence (consistency) at each pixel. The connectivity potential defined previously is computed on the basis of the deviation of intensity difference across time. However, regardless of real object boundaries or motion, loop coherence is broken apart if the intensity variation is just large. In view of this, in one implementation, the connectivity potential is measured instead by computing the difference of semantic label occurrence distribution. The semantic label occurrence measure is a per-pixel histogram of an object label across time. If two histograms are similar, it indicates that two pixels have the similar semantic occurrence behavior.

The $\alpha_1$ and $\alpha_2$ balance parameters in Eq. 1 can be tuned. In one implementation, the semantic information is employed to accomplish this balance parameter adjustment. Given per-pixel semantic label information, the balance parameters are adaptively adjusted to control the dynamicity of labels. To this end, objects are classified as being natural or non-natural objects to encourage the diversity of loop labels or to synchronize loop labels, respectively. The natural category denotes objects like trees, water, grass, waterfalls, and so on, which are natural things and are often easily loopable. The non-natural category denotes objects like a person, animal, car, and so on, which are sensitive to label incompatibility (incoherence). Additionally, we observe that long periods are favored for natural objects in that it is perceptually natural, while short period are perceptibly unnatural. In order to encourage long period, a high penalty is added on natural object regions for short period labels.

In one implementation, the MRF optimization is solved by α-expansion. However, since the number of the label space is the outer product of candidate start times s and periods p, i.e., |s|×|p|, directly optimizing Eq. (1) may produce poor local minima. This is because a graph cut α-expansion deals with a single new candidate label at a time. In one implementation, this issue is addressed using a multi-stage approach, which can be regarded as an alternative directional optimization. The procedures are as follows: 1) For each candidate looping period p>1, the per-pixel start times $s_{x|p}$ are found that create the best video-loop L given the fixed p, saying L|p, by solving a multi-label graph cut. This multi-label graph cut is initialized by the start frames $s_{x|p}$ that independently minimizes $E_{temp}$ on a per pixel basis. 2) Given an object label, per-pixel periods $p_x \geq 1$ are solved for that define the best video-loop $(p_x, s_{x|p_x})$ using the pixel start times obtained in the first state, again by solving a multi-label graph cut for the videoloop generation. In this stage, the set of labels includes all the periods p>1 considered in the first stage, together with all possible frames $s'_x$ for the static case p=1.

3) Due to the restriction of the paired label in the first phase, it can be stuck into a poor solution. In this stage, the periods of each pixel obtained from the second stage are corrected and a multi-label graph cut is solved only for $s_x$.

The number of labels optimized in the first stage is equal to the feasible start frames |s| for each period. In the second stage, the number of labels is |p|+|s|: the optimized loops found in the first stage for periods p plus the static loops corresponding to the frames s of the input video. Lastly, the number of labels is |s| in the third stage. In accordance with these number of labels, the computational complexity of this multi-phase approach is significantly lower than direct one-shot multi-label graph cut with |p|×|s| number of labels.

As aforementioned, the semantic feature F(x, t) can be any type of feature vector that can measure semantic difference between two pixels, e.g., including label map, semantic segmentation responses, intermediate activation of CNN, and so on. For example, in one tested implementation, the semantic segmentation responses obtained from the semantic segmentation approaches described in J. Long, E. Shelhamer, and T. Darrell, "Fully Convolutional Networks for Semantic Segmentation," IEEE Conference on Computer Vision and Pattern Recognition, 2015; and J. Dai, K. He, and J. Sun, "Convolutional Feature Masking for Joint Object and Stuff Segmentation," IEEE Conference on Computer Vision and Pattern Recognition 2015 were used as the semantic feature F(x, t). These semantic segmentation responses are applied to each frame of the input video. In one tested implementation, the models learned using the approach described in R. Mottaghi, X. Chen, X. Liu, N.-G. Cho, S.-W. Lee, S. Fidler, R. Urtasun, and A. Yuille, "The Role of Context for Object Detection and Semantic Segmentation in the Wild" IEEE Conference on Computer Vision and Pattern Recognition 2014 were used for the two semantic segmentations. This produces a 60 dimensional output vector for each pixel. It is noted that when feeding this vector representing F(x; t) into the optimization, it is normalize so that its sum is one.

In one implementation, an ensemble approach is taken to exploit the semantic information as much as possible. Although the aforementioned J. Long et al. approach involves fully convolutional features, a fixed kernel size employed in the approach can affect the final segmentation results depending on the input resolution. In view of this, in one implementation, the J. Long et al. approach is used to scale a pyramid with 3 levels, and to upsample the semantic response passing through the softmax layer employed in the approach to match the resolution with the input size. Then, the responses are aggregated by average pooling. The responses obtained from the aforementioned J. Dai et al. approach are then aggregated with the J. Long et al. approach responses. This produces a voting effect from the different models.

The aforementioned 60 dimensional feature can introduce high dimensional vector computation and possibly high computational complexity. In view of this, in one implementation, a principal component analysis is applied to project the features into a lower-dimensional space. It is seamlessly possible to replace the semantic feature terms in this manner because the cost functions do not require any explicit label information. Thus, an implicit low-dimensional feature can be used to measure the degree of semantic similarity between two pixels.

Figure 6:
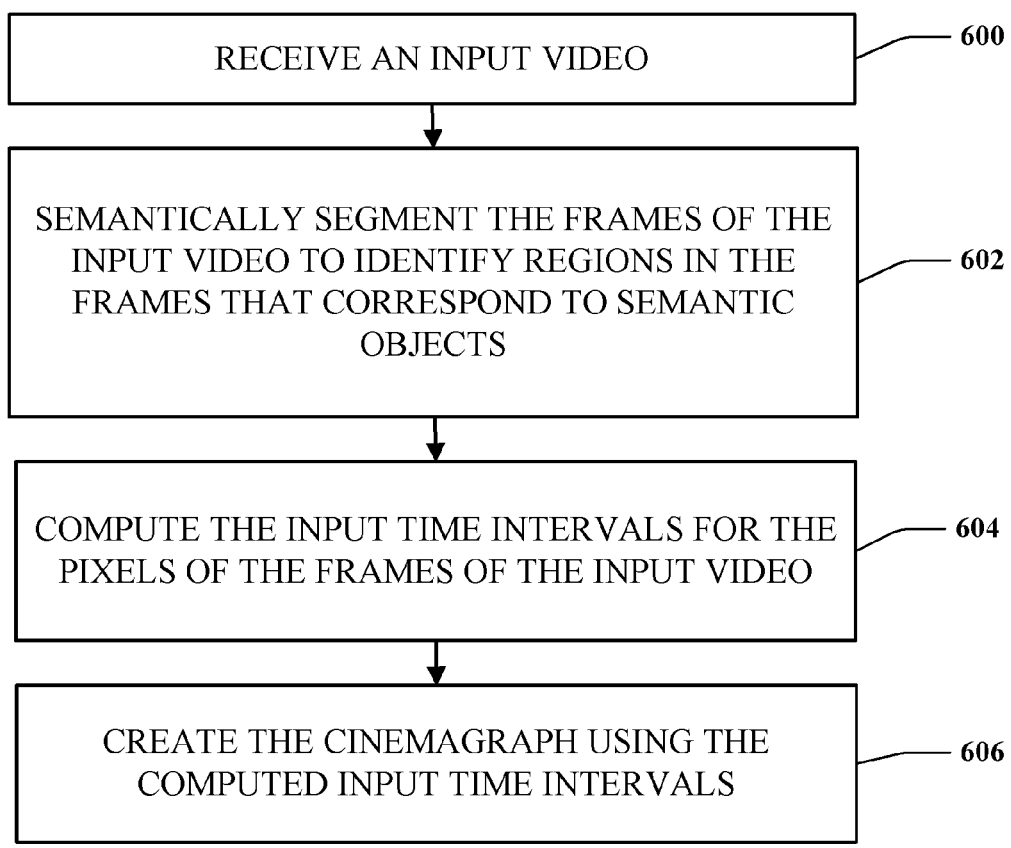
FIG. 6 is a flow diagram that illustrates another exemplary methodology for generating a cinemagraph that includes one or more video loops.

Referring again to the system 100 of FIG. 1, given the foregoing, in one implementation, a cinemagraph having one of more video loops is generated as follows. Referring now to FIG. 6, the cinemagraph generator sub-programs configure the computing device(s) to generate a cinemagraph by first receiving an input video (600), as indicated previously. The frames of the input video are than semantically segmented to identify regions in the frames that correspond to semantic objects (602). This is followed by computing input time intervals for the pixels of the frames of the input video (604). The input time interval for a particular pixel includes a per-pixel loop period and a per-pixel start time of a loop at the particular pixel. In addition, the input time interval of a pixel is based, in part, on semantic terms which keep pixels associated with the same semantic object in the same video loop. The cinemagraph is then created using the input time intervals computed for the pixels of the frames of the input video (606). The cinemagraph typically exhibits regions that appear static to a viewer and regions that include dynamic video loops that appear to the viewer to be changing over time.

The aforementioned cinemagraph generator sub-program for computing input time intervals for the pixels of the frames of the input video includes determining the respective input time intervals for the pixels that optimize an objective function. This objective function includes a temporal consistency term which is indicative of a temporal semantic consistency and a temporal photometric consistency across the frames from a loop start frame to an end loop frame; a static term which assigns a penalty value to static pixels; and a spatial consistency term which is indicative of a spatial semantic compatibility and a spatial photometric compatibility between spatially adjacent pixels over a loop period.

The foregoing semantic terms measure the semantic difference between pixels. As indicated previously, in one implementation, each semantic term is in the form a feature vector that measures the semantic difference between pixels based on at least one of a semantic label map, or semantic segmentation responses, or intermediate activation of a Convolutional Neural Network (CNN).

Figure 7:
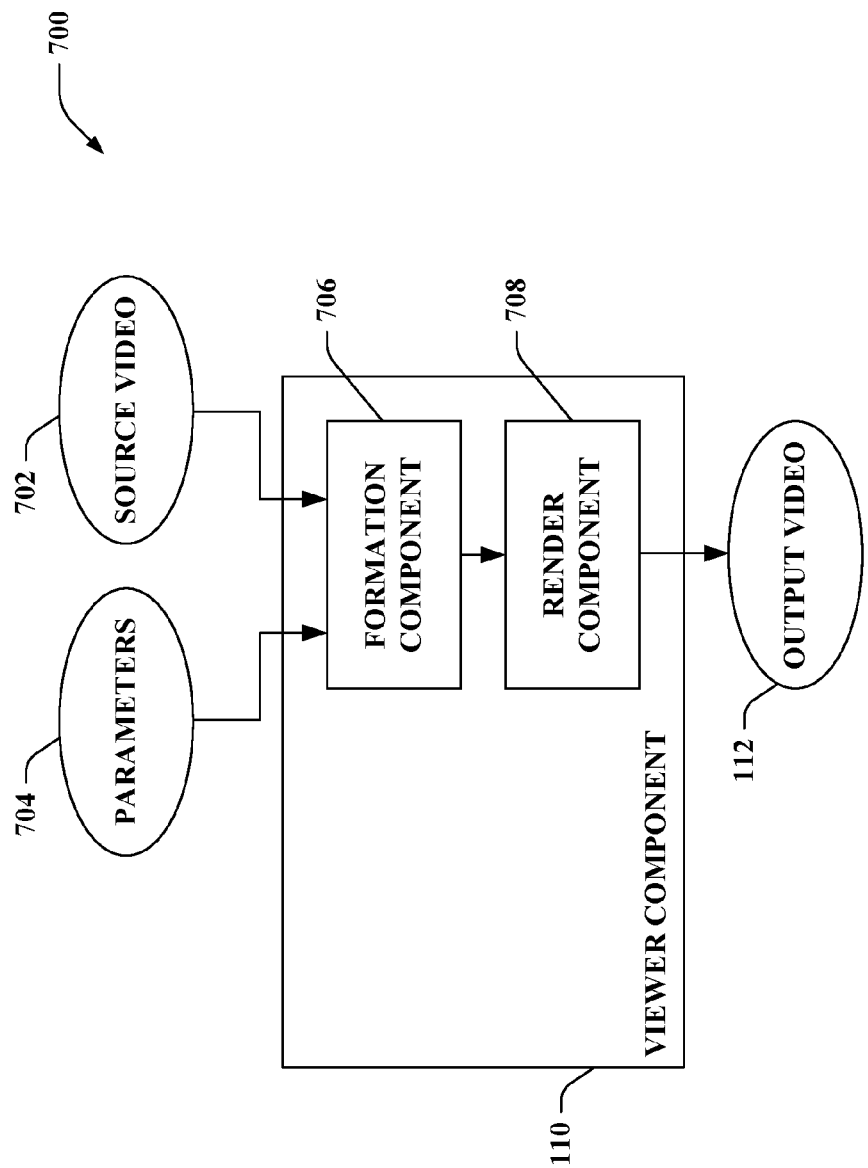
FIG. 7 illustrates a functional block diagram of an exemplary system that controls rendering of an output video.

Turning to FIG. 7, illustrated is a system 700 that controls rendering of the output video 112. The system 700 includes the viewer component 110, which can obtain a source video 702. The source video 702, for example, can be the input video 102 of FIG. 1. The parameters 704 can include, for each pixel, the per-pixel start times $s_x$, the per-pixel loop period $p_x$, and the static time $s'_x$.

The viewer component 110 can include a formation component 706 and a render component 708. The formation component 706 can create the output video 112 based upon the source video 702 and the parameters 704. The parameters 704 can encode a respective input time interval within a time range of the source video 702 for each pixel in the source video 702. Moreover, a respective input time interval for a particular pixel can include a per-pixel loop period of a loop at the particular pixel within the time range from the source video 702. The respective input time interval for the particular pixel can also include a per-pixel start time of the loop at the particular pixel within the time range from the source video 702. Further, the render component 710 can render the output video on a display screen of a device.

Various other exemplary aspects generally related to the claimed subject matter are described below. It is to be appreciated, however, that the claimed subject matter is not limited to the following examples.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
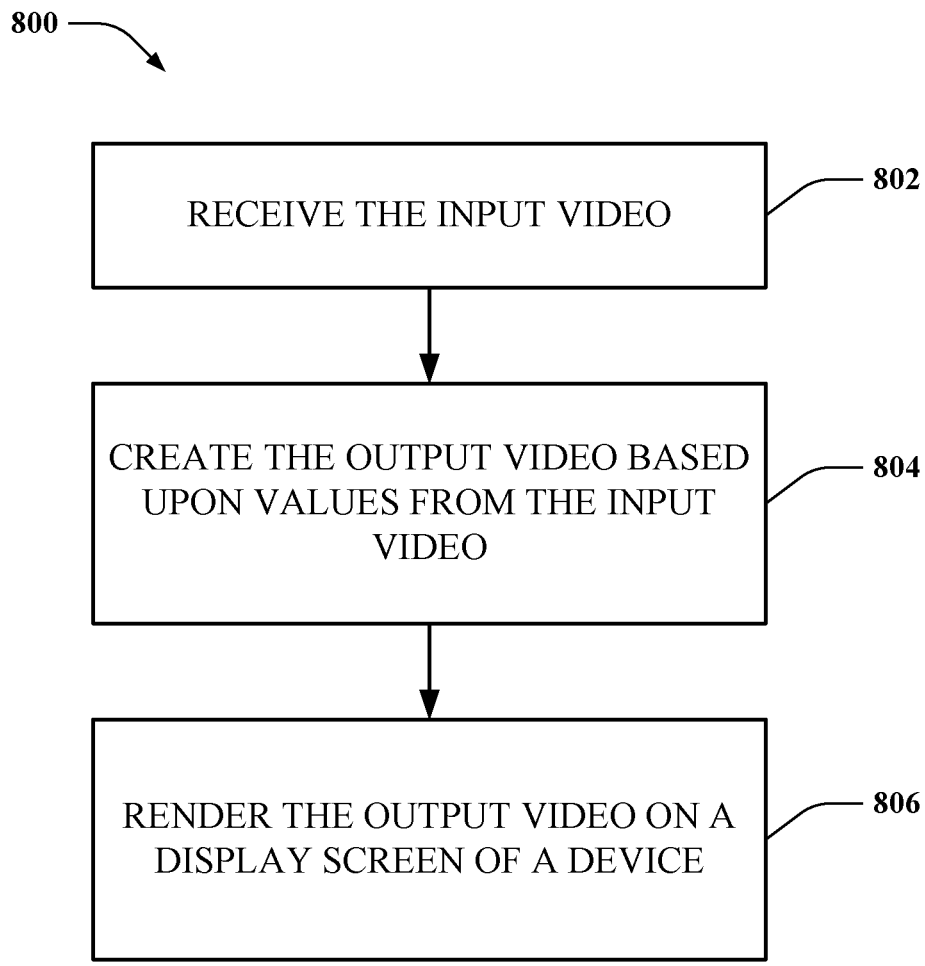
FIG. 8 is a flow diagram that illustrates an exemplary methodology for displaying an output video on a display screen of a device.

With reference to FIG. 8, illustrated is a methodology 800 for displaying an output video in the form of a cinemagraph on a display screen of a device. At 802, the input video is received, and the cinemagraph is created based upon values from the input video. Finally, at 804, the output video can be rendered on the display screen of the device. For example, the cinemagraph can be created in real-time per frame as needed for rendering. Thus, using a time-mapping function as described herein, values at each pixel can be retrieved from respective input time intervals in the input video.

Figure 9:
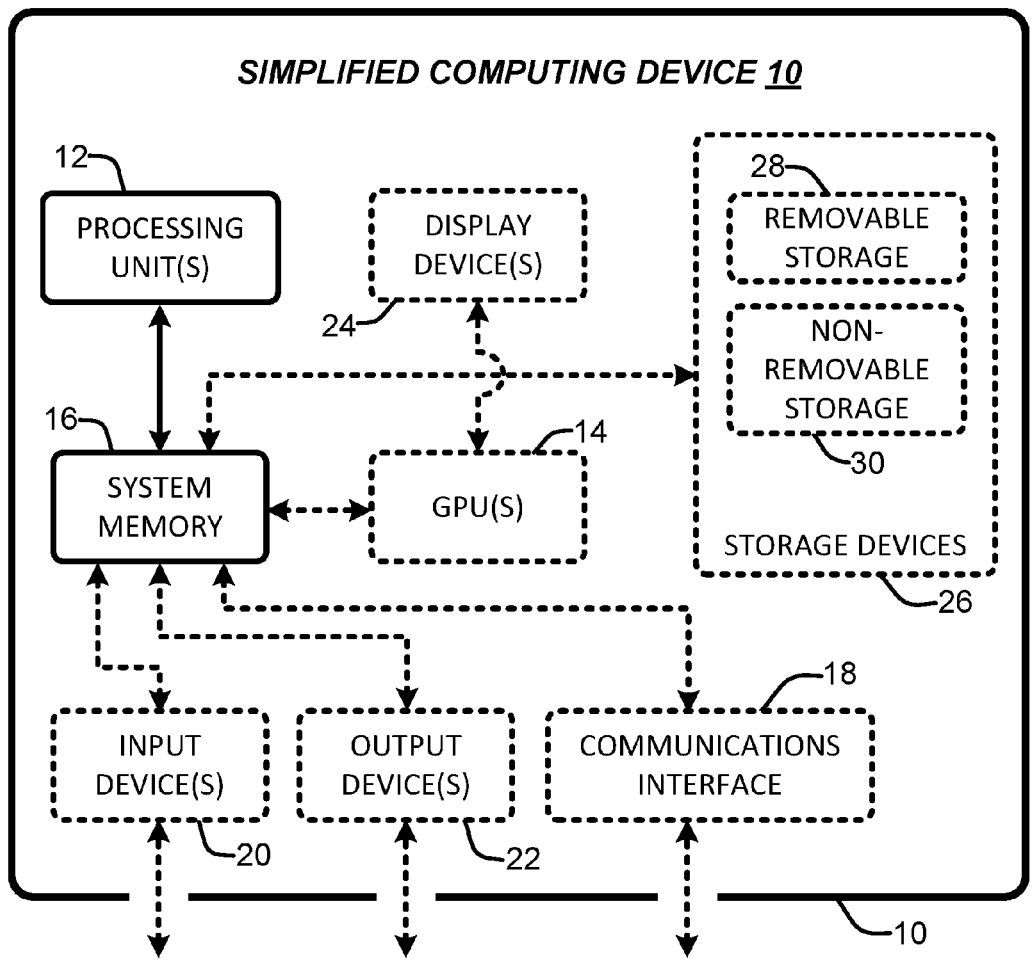
FIG. 9 is a diagram illustrating a simplified example of a general-purpose computer system on which various implementations and elements for generating a cinemagraph that includes one or more video loops, as described herein, may be realized.

Referring now to FIG. 9, the systems and methodologies disclosed herein for generating a cinemagraph that includes one or more video loops are operational within numerous types of general purpose or special purpose computing system environments or configurations. FIG. 9 illustrates a simplified example of a general-purpose computer system on which various implementations and elements for generating a cinemagraph, as described herein, may be implemented. It is noted that any boxes that are represented by broken or dashed lines in the simplified computing device 10 shown in FIG. 9 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the cinemagraph generating implementations described herein, the device should have a sufficient computational capability and system memory to enable basic computational operations. In particular, the computational capability of the simplified computing device 10 shown in FIG. 9 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the cinemagraph generating implementations described herein, including input, output, control, feedback, and response to one or more users or other devices or systems associated with the cinemagraph generating implementations, are enabled by a variety of Natural User Interface (NUI) scenarios. The NUI techniques and scenarios enabled by the cinemagraph generating implementations include, but are not limited to, interface technologies that allow one or more users user to interact with the cinemagraph generating implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the cinemagraph generating implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the cinemagraph generating implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 9 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various cinemagraph generating implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The cinemagraph generating implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The cinemagraph generating implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

While cinemagraph generation has been described by specific reference to implementations thereof, it is understood that variations and modifications thereof can be made without departing from its true spirit and scope. It is noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Wherefore, what is claimed is:

1. A system for generating a cinemagraph comprising one or more video loops, comprising:
a cinemagraph generator comprising one or more computing devices, said computing devices being in communication with each other via a computer network whenever there is a plurality of computing devices, and a computer program having a plurality of sub-programs executable by said computing devices, wherein the sub-programs configure said computing devices to,
receive an input video, wherein the input video comprises a sequence of frames each frame of which comprises pixels,
semantically segment the frames of the input video to identify regions in the frames that correspond to semantic objects,
compute input time intervals for the pixels of the frames of the input video, wherein an input time interval for a particular pixel comprises a per-pixel loop period and a per-pixel start time of a loop at the particular pixel, and wherein the input time interval of a pixel is based, in part, on semantic terms which keep pixels associated with the same semantic object in the same video loop, and
create a cinemagraph using the input time intervals computed for the pixels of the frames of the input video, wherein the cinemagraph exhibits regions that appear static to a viewer and regions comprising dynamic video loops that appear to the viewer to be changing over time.

2. The system of claim 1, wherein the sub-program for computing input time intervals for the pixels of the frames of the input video, comprises determining the respective input time intervals for the pixels that optimize an objective function, wherein the objective function comprises a temporal consistency term which is indicative of a temporal semantic consistency and a temporal photometric consistency across the frames from a loop start frame to an end loop frame.

3. The system of claim 1, wherein the sub-program for computing input time intervals for the pixels of the frames of the input video, comprises determining the respective input time intervals for the pixels that optimize an objective function, wherein the objective function comprises a static term which assigns a penalty value to static pixels.

4. The system of claim 1, wherein the sub-program for computing input time intervals for the pixels of the frames of the input video, comprises determining the respective input time intervals for the pixels that optimize an objective function, wherein the objective function comprises a spatial consistency term which is indicative of a spatial semantic compatibility and a spatial photometric compatibility between spatially adjacent pixels over a loop period.

5. The system of claim 1, wherein the semantic terms measure the semantic difference between pixels.

6. The system of claim 5, wherein each semantic term is in the form a feature vector that represents the semantic difference between pixels based on at least one of a semantic label map, or semantic segmentation responses, or intermediate activation of a Convolutional Neural Network.

7. The system of claim 6, wherein a principal component analysis is applied to the feature vector representing the semantic term to project the feature from a higher-dimensional vector space to a lower-dimensional vector space.

8. The system of claim 5, wherein each semantic term is computed using two or more semantic segmentation methods, and the responses obtained from each of the semantic segmentation methods employed are aggregated.

9. A system for generating a cinemagraph comprising one or more video loops, comprising:
a cinemagraph generator comprising one or more computing devices, said computing devices being in communication with each other via a computer network whenever there is a plurality of computing devices, and a computer program having a plurality of sub-programs executable by said computing devices, wherein the sub-programs configure said computing devices to,
receive an input video, wherein the input video comprises a sequence of frames each frame of which comprises pixels,
semantically segment the frames of the input video to identify regions in the frames that correspond to semantic objects and the semantic object depicted in each identified region, compute input time intervals for the pixels of the frames of the input video, wherein an input time interval for a particular pixel comprises a per-pixel loop period and a per-pixel start time of a loop at the particular pixel, and wherein the input time interval for pixels residing in regions corresponding to a semantic object is based, in part, on a semantic term which keep pixels associated with the same semantic object in the same video loop, and create a cinemagraph using the input time intervals computed for the pixels of the frames of the input video, wherein the cinemagraph exhibits regions that appear static to a viewer and regions comprising dynamic video loops that appear to the viewer to be changing over time.

10. The system of claim 9, wherein the sub-program for computing input time intervals for the pixels of the frames of the input video, comprises determining the respective input time intervals for the pixels that optimize an objective function, wherein the objective function comprises a temporal consistency term which is indicative of a temporal photometric consistency across the frames from a loop start frame to an end loop frame.

11. The system of claim 9, wherein the sub-program for computing input time intervals for the pixels of the frames of the input video, comprises determining the respective input time intervals for the pixels that optimize an objective function, wherein the objective function comprises a static term which assigns a penalty value to static pixels.

12. The system of claim 9, wherein the sub-program for computing input time intervals for the pixels of the frames of the input video, comprises determining the respective input time intervals for the pixels that optimize an objective function, wherein the objective function comprises either a spatial consistency term which is indicative of a spatial photometric compatibility between spatially adjacent pixels over a loop period, or the semantic term, whichever is greater for the pixel.

13. The system of claim 12, wherein the sub-program for computing input time intervals for the pixels of the frames of the input video, comprises a sub-program for computing a semantic term for the pixels associated with each identified semantic object, wherein the semantic term computation comprises:

for each sequential pair of frames,
    computing the ratio of the intersection of the regions in the pair of frames associated with the semantic object under consideration,
    establishing a multiplier using the computed ratio that increases as the computed ratio increases,
    computing the semantic term for the pair of frames under consideration as the product of the multiplier and a prescribed minimum semantic cost; and
establishing the semantic term for the pixels associated with the identified semantic object as the maximum semantic term computed among the pairs of frames.

14. The system of claim 13, wherein computing the ratio of the intersection of the regions in a pair of frames associated with a semantic object comprises computing the ratio of the number of pixels associated with intersection of the regions in the pair of frames associated with the semantic object, and the number of pixels associated with the larger of the two regions in the pair of frames associated with the semantic object.

15. The system of claim 9, wherein the sub-program for semantically segmenting the frames of the input video to identify regions in the frames that correspond to semantic objects and the semantic object depicted in each identified region, comprises identifying more than one type of semantic object.

16. The system of claim 9, wherein the sub-program for semantically segmenting the frames of the input video to identify regions in the frames that correspond to semantic objects and the semantic object depicted in each identified region, comprises identifying a person's face.

17. A computer-implemented process for generating a cinemagraph comprising one or more video loops, the process comprising the actions of:

using one or more computing devices to perform the following process actions, the computing devices being in communication with each other via a computer network whenever a plurality of computing devices is used:

receiving an input video, wherein the input video comprises a sequence of frames each frame of which comprises pixels;

semantically segmenting the frames of the input video to identify regions in the frames that correspond to one or more semantic objects;

computing input time intervals for the pixels of the frames of the input video, wherein an input time interval for a particular pixel comprises a per-pixel loop period and a per-pixel start time of a loop at the particular pixel, and wherein the input time interval of a pixel is based, in part, on one or more semantic terms which keep pixels associated with the same semantic object in the same video loop; and creating a cinemagraph using the input time intervals computed for the pixels of the frames of the input video, wherein the cinemagraph exhibits regions that appear static to a viewer and regions comprising dynamic video loops that appear to the viewer to be changing over time.

18. The process of claim 17, wherein the process action for computing input time intervals for the pixels of the frames of the input video, comprises determining the respective input time intervals for the pixels that optimize an objective function, wherein the objective function comprises a temporal consistency term which is indicative of a temporal semantic consistency and a temporal photometric consistency across the frames from a loop start frame to an end loop frame, a static term which assigns a penalty value to static pixels, and a spatial consistency term which is indicative of a spatial semantic compatibility and a spatial photometric compatibility between spatially adjacent pixels over a loop period.

19. The process of claim 18, wherein the spatial consistency term also includes a connectivity potential factor which accounts for spatial coherence at each pixel.

20. The process of claim 19, wherein the connectivity potential factor is defined as the difference of a semantic label occurrence distribution between adjacent pixels, and wherein the semantic label occurrence distribution of a pixel is computed as a histogram of semantic object labels assigned to the pixel over time as a result of the semantic segmenting of the frames of the input video.

* * * * *